US010752132B2

(12) United States Patent
Fitzpatrick et al.

(10) Patent No.: US 10,752,132 B2
(45) Date of Patent: Aug. 25, 2020

(54) VEHICLE WITH SEAT AND DEPLOYABLE WORKING SURFACE

(71) Applicant: Faurecia Interior Systems, Inc., Auburn Hills, MI (US)

(72) Inventors: Robert Fitzpatrick, Holland, MI (US); Markus Uhlig, Stuttgart (DE); Desmond O'Regan, Bad Homburg (DE); Matthew Benson, Holland, MI (US); Fabrice Aycoberry, St. Germaine en Laye (FR)

(73) Assignee: FAURECIA INTERIOR SYSTEMS, INC., Auburn Hills, MI (US)

( * ) Notice: Subject to any disclaimer, the term of this patent is extended or adjusted under 35 U.S.C. 154(b) by 0 days.

(21) Appl. No.: 15/936,774

(22) Filed: Mar. 27, 2018

(65) Prior Publication Data
US 2018/0272900 A1 Sep. 27, 2018

Related U.S. Application Data

(60) Provisional application No. 62/477,339, filed on Mar. 27, 2017.

(51) Int. Cl.
*B60N 2/20* (2006.01)
*B60N 2/75* (2018.01)
(Continued)

(52) U.S. Cl.
CPC ............. *B60N 2/206* (2013.01); *B60N 2/01* (2013.01); *B60N 2/14* (2013.01); *B60N 2/79* (2018.02);
(Continued)

(58) Field of Classification Search
CPC .......... B60N 2/206; B60N 2/79; B60N 2/793; B60N 2/01; B60N 2/14; B60N 3/001; B60N 3/004; B60N 2002/0055; B60N 2002/02
See application file for complete search history.

(56) References Cited

U.S. PATENT DOCUMENTS

| 5,542,360 A | 8/1996 | Fleming |
| 6,692,051 B1 * | 2/2004 | Cook ..................... B60N 2/062 296/190.01 |

(Continued)

FOREIGN PATENT DOCUMENTS

| DE | 10105589 C1 | 4/2002 |
| DE | 10057450 A1 | 5/2002 |

(Continued)

OTHER PUBLICATIONS

European Search Report corresponding to EP application No. 18162796.9, dated Oct. 29, 2018, 6 pages.

*Primary Examiner* — Philip F Gabler
(74) *Attorney, Agent, or Firm* — Reising Ethington P.C.

(57) ABSTRACT

A deployable working surface is provided for use in a reconfigurable passenger cabin of a personal automotive vehicle. The vehicle includes a first seat that can rotate to an inwardly-rotated position. The working surface is provided by a panel that is mounted on a second seat for movement between a stowed position and a working position. This movement includes vertical movement and rotational movement about a vertical axis. When the panel is in the working position, the working surface extends in a radial direction that is perpendicular to the direction the first seat is facing when in the rotated position and is positioned higher that an occupant seating surface of the first seat and in front of a backrest of the first seat.

20 Claims, 4 Drawing Sheets

(51) Int. Cl.
*B60N 3/00* (2006.01)
*B60N 2/01* (2006.01)
*B60N 2/14* (2006.01)
B60N 2/02 (2006.01)
B60N 2/005 (2006.01)

(52) U.S. Cl.
CPC ............ *B60N 2/793* (2018.02); *B60N 3/001* (2013.01); *B60N 3/004* (2013.01); *B60N 2002/0055* (2013.01); *B60N 2002/022* (2013.01)

(56) References Cited

U.S. PATENT DOCUMENTS

| | | | |
|---|---|---|---|
| 7,303,226 B2* | 12/2007 | Bernstein | B60N 2/14 296/190.01 |
| 7,607,726 B2* | 10/2009 | Orlo | B60N 3/004 248/421 |
| 9,758,064 B1* | 9/2017 | Dry | B60N 3/002 |
| 10,154,730 B2* | 12/2018 | Natuzzi | A47B 5/04 |
| 2002/0060481 A1 | 5/2002 | Jones | |
| 2010/0109389 A1 | 5/2010 | Charpentier et al. | |
| 2015/0284088 A1* | 10/2015 | Gow | B64D 11/0638 297/174 R |
| 2016/0152163 A1 | 6/2016 | Strasdat et al. | |
| 2016/0332539 A1* | 11/2016 | Rawlinson | B60N 2/0244 |
| 2017/0021932 A1* | 1/2017 | Marais | B64D 11/0638 |

FOREIGN PATENT DOCUMENTS

| | | |
|---|---|---|
| DE | 10335046 A1 | 2/2005 |
| DE | 202009000895 U1 | 7/2009 |
| DE | 102009022625 A1 | 12/2009 |
| DE | 102014224560 A1 | 6/2016 |
| EP | 0943485 A2 | 9/1999 |
| EP | 2109554 B1 | 6/2012 |
| FR | 2935322 A1 | 3/2010 |
| FR | 3025147 A1 | 3/2016 |
| GB | 2395118 A | 5/2004 |
| JP | 2007008180 A | 1/2007 |
| JP | 2007112423 A | 5/2007 |
| WO | WO2013123957 A1 | 8/2013 |

* cited by examiner

VEHICLE WITH SEAT AND DEPLOYABLE WORKING SURFACE

TECHNICAL FIELD

The present disclosure relates generally to personal automotive vehicles with reconfigurable passenger cabins and is particularly pertinent to autonomous vehicles.

BACKGROUND

Personal automotive vehicles have evolved over several decades to require less attention from a human driver during vehicle operation. For instance, modern automobiles may be equipped with headlights that self-illuminate in low lighting conditions, windshield wipers that self-activate during rainy weather, or climate-control systems that automatically regulate the temperature of the passenger cabin, to name a few examples. Emerging technologies now enable automobiles to continuously monitor surrounding road and traffic conditions, have real-time knowledge regarding the global position of the vehicle, and to control vehicle acceleration, braking, and navigation based on this information. The trend is toward fully autonomous vehicles, in which little to no attention to vehicle operation is required from vehicle occupants once a destination for the vehicle is determined. In such vehicles, vehicle occupants are free to turn their attention to matters other than driving, such as work-related tasks, entertainment, or relaxation.

During the transition from traditional driver-operated vehicles to fully autonomous vehicles, reconfigurable passenger cabins may be employed to accommodate both a driver mode and an autonomous mode. With driver attention to vehicle operation not required in the autonomous mode, the driver may wish to assume a different or more comfortable seating position than the one required during traditional vehicle operation, in which driver feet must be near the accelerator and brake pedal and driver arms must be able to reach and turn the steering wheel, operate turn signals, etc. In some cases, the driver may wish to engage in activities normally reserved for the home or office, such as personal computer use, reading, writing, studying, etc. Many of such activities require or can be more easily performed when a space such as a desk is provided for distributing materials in front of the person and/or for resting arms or other objects on.

U.S. Pat. No. 7,607,726 to Orlo et al. discloses a seat back tray with a tray top that pivots with respect to the back of a folded passenger seat to change the orientation of the tray top so that it extends further toward the driver seat. The seat back tray includes a non-pivoting tray top with a track formed therein to help guide the pivoting tray top during movement. A scissor-life moves the seat back tray with respect to the back of the folded seat. It the pivoted position, the tray top is rotated by 90 degrees to overlies part of the center console, but does not extend over the driver seat.

SUMMARY

In accordance with an embodiment, a personal automotive vehicle having a reconfigurable passenger cabin includes a first seat, a second seat, and a panel mounted on the second seat. The first seat is coupled with a body of the vehicle in the passenger cabin for rotational movement between a forward-facing position and an inwardly-rotated position. The first seat includes a seat bottom and a backrest, and the seat bottom has an occupant seating surface. The second seat is coupled with the body of the vehicle and spaced transversely from the first seat in the passenger cabin. The panel has a working surface and is moveable between a stowed position and a working position. Movement of the panel between the stowed position and the working position includes vertical movement and rotation about a vertical axis. When the first seat is in the inwardly-rotated position and the panel is in the working position, the working surface of the panel is higher than the occupant seating surface and in front of the backrest and extends radially away from the vertical axis in a direction orthogonal with a longitudinal axis of the first seat.

In some embodiments, the working surface is moveable in forward and rearward directions via movement of the second seat in the forward and rearward directions.

In some embodiments, the panel includes a first portion mounted on the second seat and a second portion that is moveable with respect to the first portion, and the second portion of the panel includes at least a portion of the working surface.

In some embodiments, a second portion of the panel is configured for translational movement with respect to a first portion of the panel in a direction that is orthogonal with the longitudinal axis of the first seat when the first seat is in the inwardly-rotated position and the panel is in the working position.

In some embodiments, a second portion of the panel is configured for rotational movement with respect to a first portion of the panel about a pivot axis that is vertical or horizontal when the panel is in the working position.

In some embodiments, the working surface extends over the occupant seating surface and beyond the longitudinal axis of the first seat when in the working position.

In some embodiments, the backrest is movable between an occupant seating position and a fold-forward position, and the panel is mounted on the backrest for movement with the backrest while the panel is in the stowed position.

In some embodiments, the working surface is in a vertical orientation and located along an inboard side of the second seat when in the stowed position.

In some embodiments, the second seat comprises an armrest that supports the panel along the vertical axis during panel movement between the stowed and working positions.

In some embodiments, a backrest of the second seat is movable between an occupant seating position and a fold-forward position and the panel is moveable between the stowed and working positions in both positions of the backrest of the second seat.

Various aspects, embodiments, examples, features and alternatives set forth in the preceding paragraphs, in the claims, and/or in the following description and drawings may be taken independently or in any combination thereof. For example, features disclosed in connection with one embodiment are applicable to all embodiments in the absence of incompatibility of features.

DESCRIPTION OF THE DRAWINGS

One or more embodiments will hereinafter be described in conjunction with the appended drawings, wherein like designations denote like elements, and wherein.

DETAILED DESCRIPTION OF EMBODIMENT(S)

Described below is a deployable working surface for use in a reconfigurable passenger cabin of a personal automotive vehicle. The working surface is configured to deploy from a stowed position along one seat of the passenger cabin for use by the occupant of another seat of the passenger cabin while the occupant is oriented in an unconventional seating position. While presented in the context of a front row of seats in the passenger cabin of an autonomous vehicle, the teachings presented herein are applicable to non-autonomous vehicles as well. For example, the unconventional passenger cabin configurations presented here may be employed while a vehicle is parked and/or used with second or third row seating.

Figure 1:
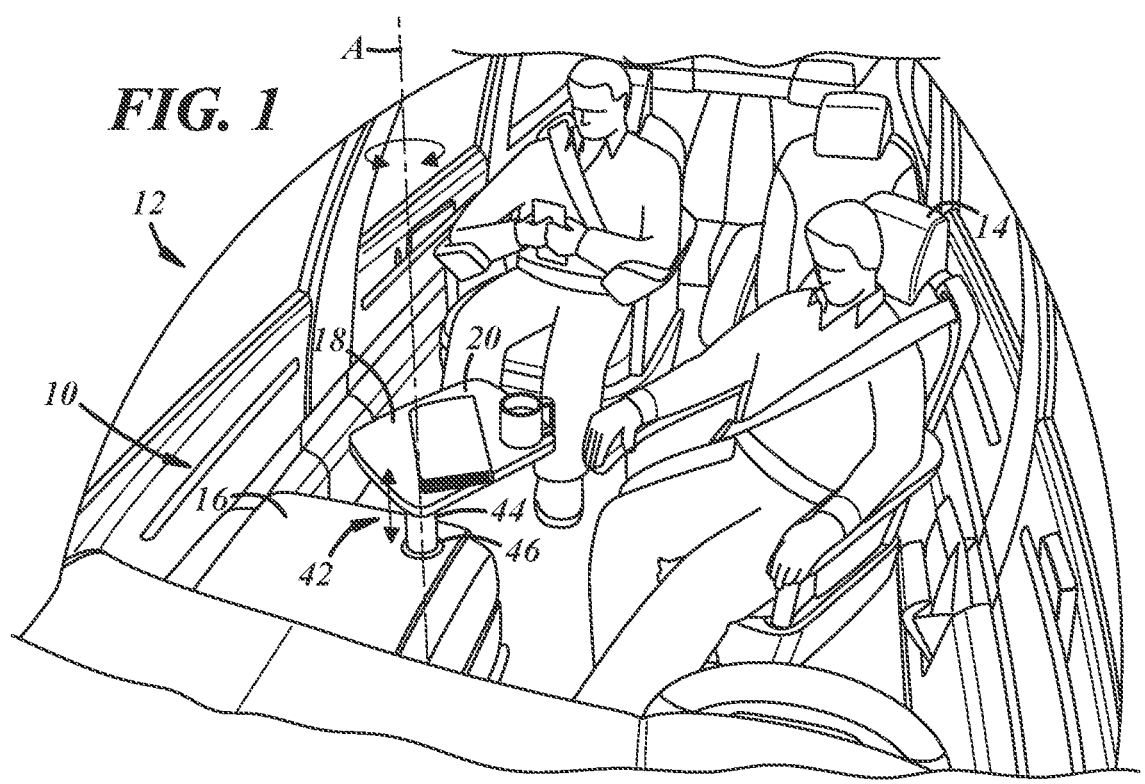
FIG. 1 is a front perspective view of an interior of a reconfigurable passenger cabin of a personal automotive vehicle, illustrating a first seat in an inwardly-rotated position and a second seat supporting a moveable panel with a working surface.

Referring to FIG. 1, there is shown a front perspective view of the interior of a passenger cabin 10 of a personal automotive vehicle 12. As used herein, the term "personal automotive vehicle" is intended to include vehicles intended primarily for personal use that usually have one to three rows of seats and are generally sized to fit in home garages and standard-size parking spaces. Examples include passenger cars, coupes, sedans, SUVs, cross-over vehicles, and light-duty pick-up trucks. The illustrated passenger cabin 10 is reconfigurable between a driving configuration and an autonomous configuration. FIG. 1 shows the passenger cabin 10 configured in one example of an autonomous configuration in which a first seat 14 is rotated away from a forward-facing position, a second seat 16 is in a fold-forward position, and a panel 18 mounted on the second seat is in a working position for the convenience of an occupant of the first seat.

The illustrated panel 18 has a generally flat working surface 20 that extends away from the second seat 16 to assume a position that is specifically intended to be usable by the occupant of the first seat 14 when the first seat is in an inwardly-rotated position as shown. The panel 18 is movable at least in a vertical direction and can rotate at least about a vertical axis A during movement between the working position and a stowed position, which is shown in dashed lines in FIG. 1.

Figure 2:
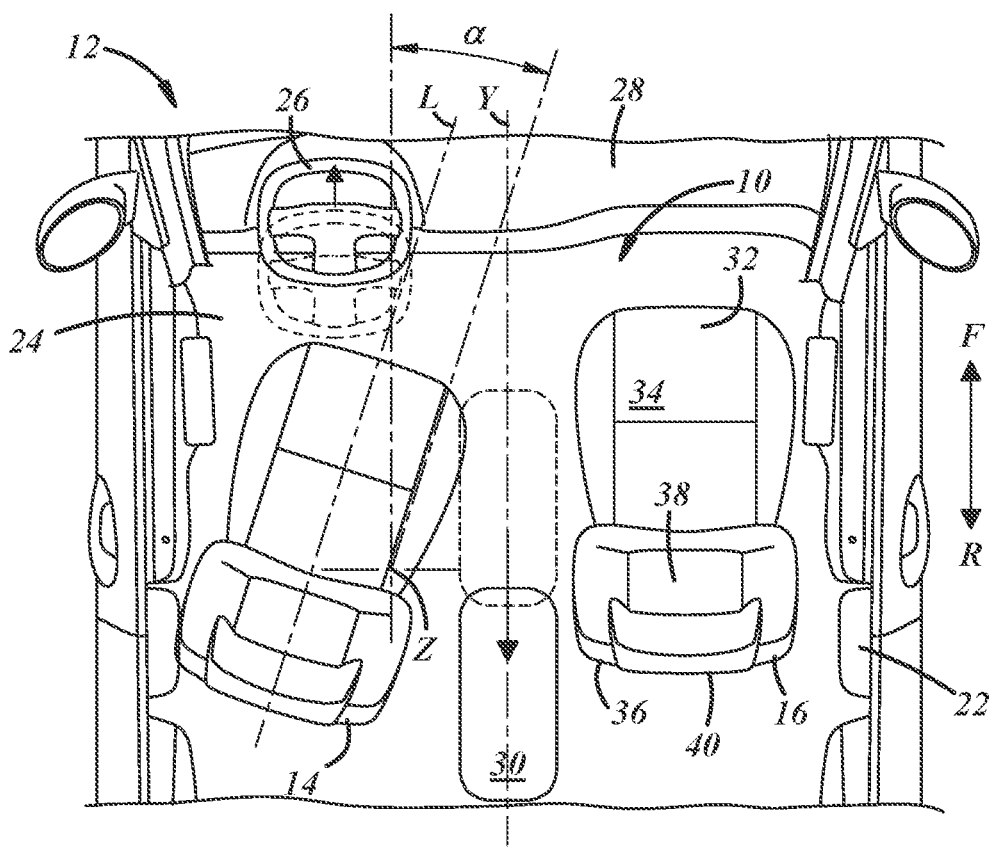
FIG. 2 is a top view of the interior of another passenger cabin illustrating the first seat in the inwardly-rotated position and the second seat in an occupant seating position.

FIG. 2 is a top view of a portion of another reconfigurable passenger cabin 10 illustrating a front row of seats, including first and second seats 14, 16. The first seat 14 is coupled with a body 22 of the vehicle 12 in the passenger cabin 10 for rotational movement about a vertical axis Z between a forward-facing position and the illustrated inwardly-rotated position. Here, "inwardly" means the front of the seat 14 is facing in a direction that intersects a central longitudinal axis Y of the vehicle 12. An angle of rotation a about the vertical axis Z is formed between the forward-facing and inwardly-rotated positions of the first seat 14 and is also defined between a longitudinal axis L of the seat 14 and the longitudinal axis Y of the vehicle 12. In this example, the angle of rotation a is about 15-25 degrees. There may be a particular pre-determined value for the angle α that is one of several inwardly-rotated positions and at which the seat 14 is configured to lock in place such that angular movement is prevented.

The second seat 16 is illustrated in a forward-facing position and is coupled with the body 22 of the vehicle 12 and spaced transversely from the first seat 14 in the passenger cabin 10. The vehicle body 22 is structural in nature and includes a floor 24 that partly defines the interior of the passenger cabin 10. Each seat 14, 16 is mounted on or over the floor 24 and may be coupled with the vehicle body 22 for adjustable movement in forward and rearward directions F, R parallel with the longitudinal axis Y of the vehicle 12. The first seat 14 is coupled with the vehicle body 22 such that the vertical axis of rotation Z moves with the seat during forward and rearward movement. In some embodiments, the second seat 16 is also rotatable away from the forward-facing position about an axis that moves with the seat during forward and rearward movement.

Other characteristics of the autonomous configuration of the cabin 10 may include a steering wheel 26 being in a retracted position, farther toward the front of the vehicle 12 and closer to an instrument panel 28 than when in the driving configuration, and a center console 30 in a stowed position, farther rearward and/or lower than when in the driving configuration. The instrument panel 28 transversely spans the front of the passenger cabin 10 and may be spaced above the floor 24 of the vehicle body 22.

Each seat 14, 16 includes a seat bottom 32 with an upward-facing occupant seating surface 34, as well as a backrest 36. Each backrest 36 may be coupled with the respective seat bottom 32 for pivotal movement about a horizontal seatback pivot axis, such as via a recliner mechanism. In this example, the panel with the deployable working surface is mounted to the backrest 36 of the second seat 16 and is not visible in the top view of FIG. 2. The illustrated second seat 16 is configured so that the backrest 36 is moveable between a generally upright occupant seating position, as shown in FIG. 2, and a fold-forward position similar to that shown in FIG. 1. When moved from the occupant seating position to the fold-forward position, a first side 38 of the backrest 36 moves from a forward-facing position to a downward-facing position, and an opposite second side 40 of the backrest moves from a rearward-facing position to an upward-facing position to present a horizontal surface.

Figure 3:
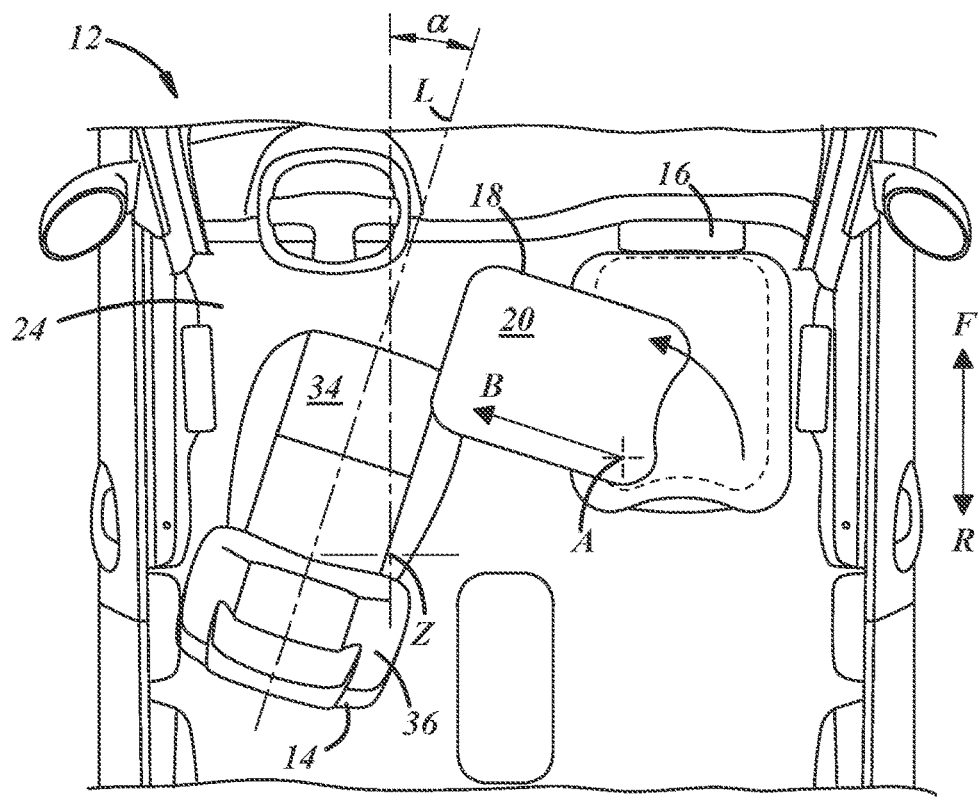
FIG. 3 is a top view of the interior of the passenger cabin of FIG. 2 illustrating the second seat in a fold-forward position and the panel in a working position.

FIG. 3 illustrates the second seat 16 in the fold-forward position and the panel 18 moved from the stowed position (shown in dashed lines) to an example of the working position. When the first seat 14 is in the inwardly-rotated position and the panel 18 is in the working position, the working surface 20 of the panel is positioned higher (i.e., farther above the floor 24) than the occupant seating surface 34 of the first seat 14 and in front of the backrest 36 of the first seat. The working surface 20 also extends radially away from the vertical axis of rotation A in a direction B orthogonal with the longitudinal axis L of the first seat 14. As used herein, "orthogonal" means either perpendicular or parallel and is intended to cover qualitative and quantitative equivalents of those terms. In this particular example, movement of the panel 18 and working surface 20 from the stowed position to the working position includes rotation about the vertical axis A in an amount equal to (90°−α). This rotation is in the opposite rotational direction from the rotation of the first seat from the forward-facing position to the inwardly-rotated position. In one embodiment, the panel 18 rotates about the vertical axis A by about 65° to 75° during movement between the stowed and working positions.

The panel 18 is also configured for vertical displacement during movement between the stowed and working positions as illustrated in FIG. 1 to ensure that the working surface 20 and the opposite side of the deployed panel 18 are properly positioned higher than the occupant seating surface 34 of the first seat 14 and/or sufficiently high to provide clearance for the legs of the occupant of the first seat, over which the panel may extend when in the working position.

The rotational movement about the vertical axis A and the vertical movement of the panel may be independent from each other or combined in a single coordinated movement. For instance, in the example of FIG. 1, the panel 18 is mounted to the second seat via a movement mechanism 42 configured to allow independent movement in the vertical and rotational directions. The mechanism 42 includes an extendable and retractable support post 44 to facilitate vertical movement and a pivot joint 46 to facilitate rotational movement. The pivot joint 46 may be located where the panel 18 joins the support post 44, where the support post joins the seat 16, or elsewhere along the support post, such as between two telescoping sections of the support post. In one example of coordinated rotation and vertical movement, the movement mechanism may include a helical track or guide on one component (e.g., the support post) and a guide follower on another component (e.g., the backrest) such that when the panel is moved vertically, it is also forced to rotate, or vice versa.

The mechanism 42 may be configured for manual and/or automatic operation. In the examples of FIGS. 1-3, movement of the panel 18 is constrained to the two illustrated degrees of freedom (one rotational and one translational) relative to the second seat 16 so that the working surface 20 remains in parallel planes (e.g., horizontal) throughout panel movement between the stowed and working positions. Additional degrees of freedom and corresponding translational and rotational movements may be additionally provided. An additional translational degree of freedom is available with respect to the vehicle body 22 by virtue of the panel 18 being mounted on the second seat 16. In this case, forward and rearward adjustment of the second seat, normally reserved for decreasing or increasing the amount of leg room available to an occupant of the second seat, includes the additional function and advantage of adjusting the distance between the deployed panel 18 and the occupant of the first seat 14.

Figure 4:
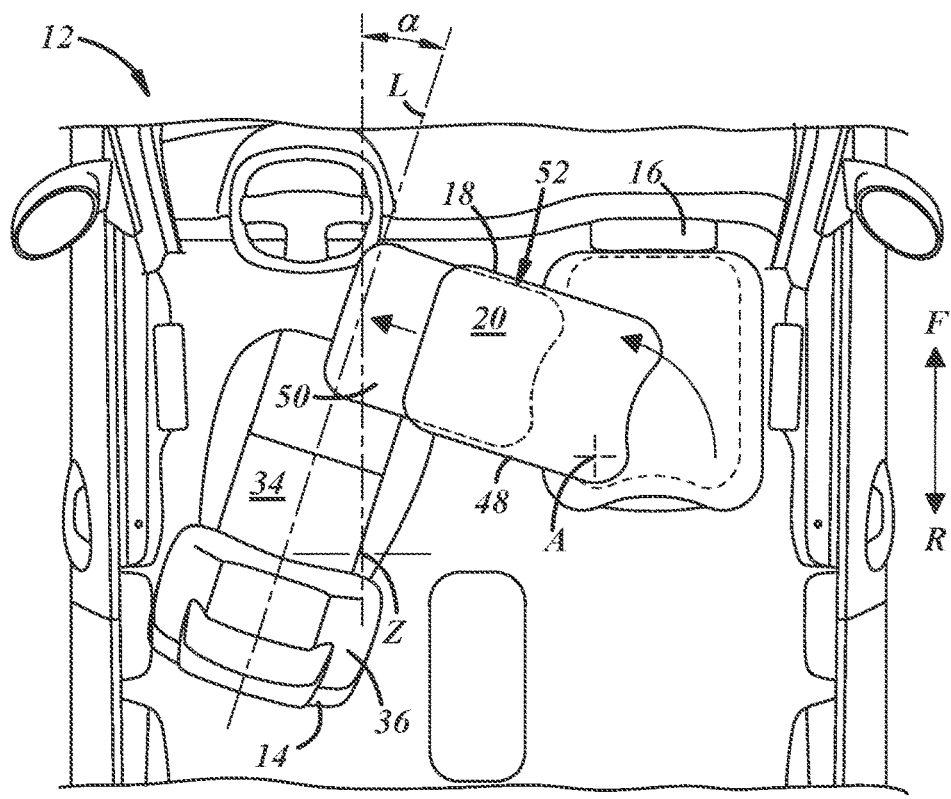
FIG. 4 is a top view of the interior of the passenger cabin of FIG. 3 illustrating the panel with a portion that extends by translation.
Figure 5:
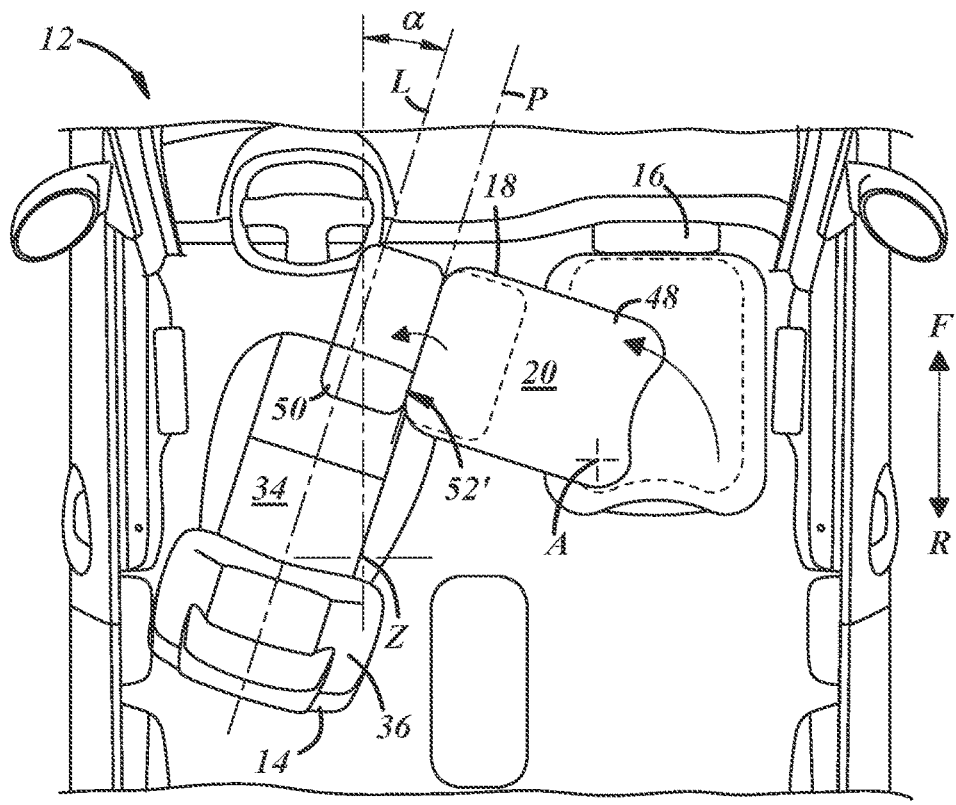
FIG. 5 is a top view of the interior of the passenger cabin of FIG. 3 illustrating the panel with a portion that extends by rotation about a horizontal axis.
Figure 6:
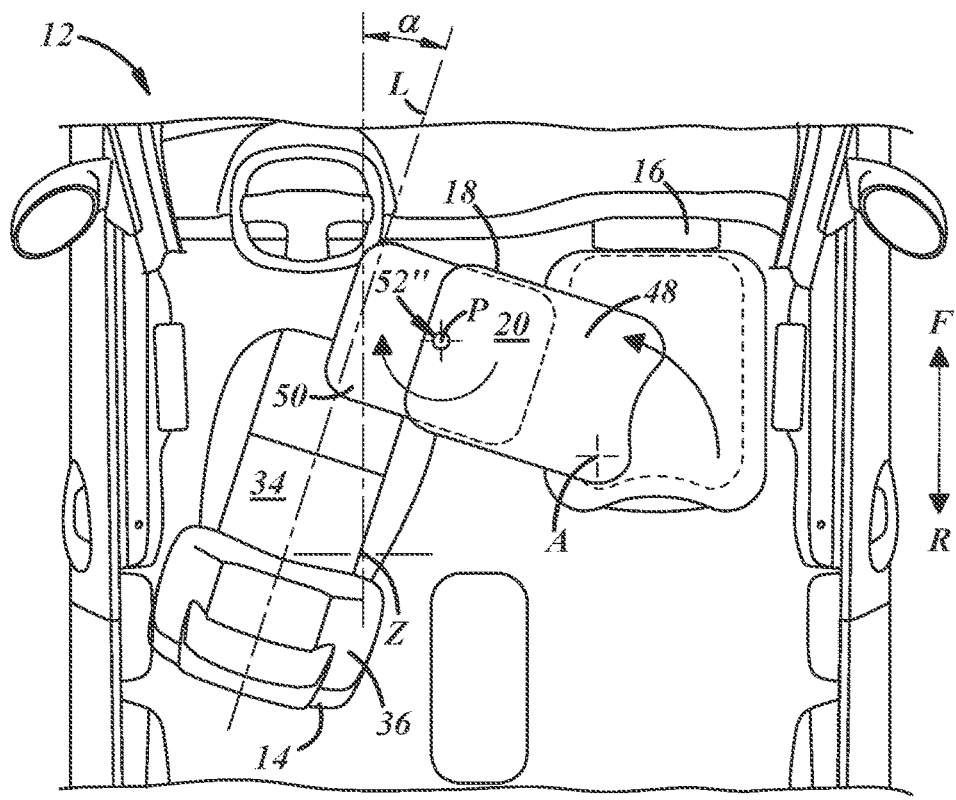
FIG. 6 is a top view of the interior of the passenger cabin of FIG. 3 illustrating the panel with a portion that extends by rotation about a vertical axis.

FIGS. 4-6 illustrate variations of the panel 18 configured to increase the size and/or improve the location of the deployed working surface 20. In these examples, the panel 18 includes a first portion 48 coupled with the second seat 16 and a second portion 50 moveably joined with the first portion via an extension joint 52, with at least a portion of the working surface 20 being provided by the second portion of the panel. The extension joint 52 facilitates movement of the second portion 50 of the panel between an extended position and a retracted position (shown in broken lines). The second portion 50 may be located either over or under the first portion 48 when in the retracted position. In each of the illustrated examples, the resulting working surface extends beyond the longitudinal axis L of the first seat 14 and thereby increases accessibility for the occupant of the first seat.

In the example of FIG. 4, the second portion 50 is a horizontal extension of the panel 18 configured to extend away from and retract toward the first portion 48 via a sliding joint 52, such as a tongue-in-groove joint. In this case, movement of the extension 50 is translational and in a direction perpendicular with the longitudinal axis L of the first seat 14. The portion of the working surface 20 provided by the extension 50 remains substantially horizontal during extension and retraction. Similar extension movement can be implemented in other directions, such as in the direction of the longitudinal axis L to bring the working surface 20 closer to the occupant of the first seat 14.

In the example of FIG. 5, the second portion 50 is a horizontal extension of the panel 18 configured to extend away from and retract toward to the first portion 48 via a pivot joint 52', such as a hinge. In this case, movement of the extension 50 is rotational about a pivot axis P that is parallel with the longitudinal axis L of the first seat 14. The portion of the working surface 20 provided by the extension 50 is substantially horizontal when extended and when retracted. During extending and retracting movement, however, the portion of the working surface 20 provided by the extension 50 rotates about the pivot axis P and changes between downward- and upward-facing orientations. Similar extension movement can be implemented in other rotational directions, such as about a pivot axis that is perpendicular with the direction of the longitudinal axis L to bring the working surface 20 closer to the occupant of the first seat 14.

In the example of FIG. 6, the second portion 50 is a horizontal extension of the panel 18 configured to extend away from and retract toward to the first portion 48 via a pivot joint 52", such as an axle. In this case, movement of the extension 50 is rotational about a vertical pivot axis P by 180°, with the extended position of the extension being substantially the same as in the example of FIG. 4. The portion of the working surface 20 provided by the extension 50 remains substantially horizontal during extension and retraction. Similar extension movement can be implemented to extend the second portion of the panel in other directions, such as in the direction of the longitudinal axis L to bring the working surface 20 closer to the occupant of the first seat 14. For instance, the vertical pivot axis P may be located elsewhere along the first portion 48 of the panel 18.

Figure 7:
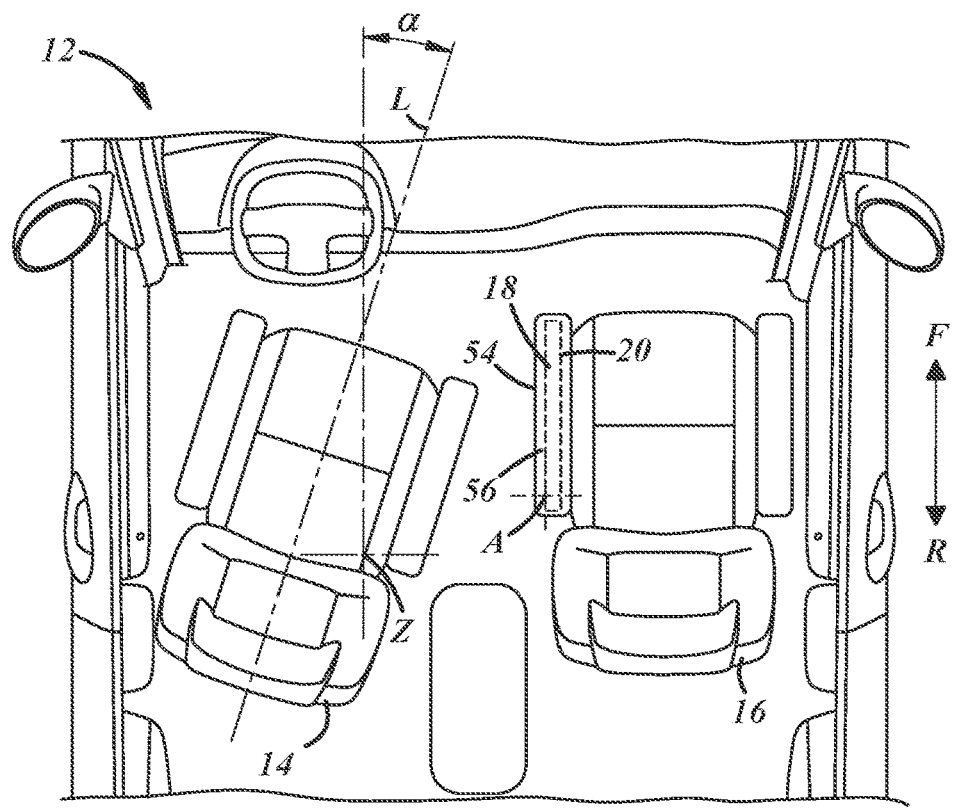
FIG. 7 is a top view of the interior of another passenger cabin illustrating a stowed position in which the panel is vertically oriented.
Figure 8:
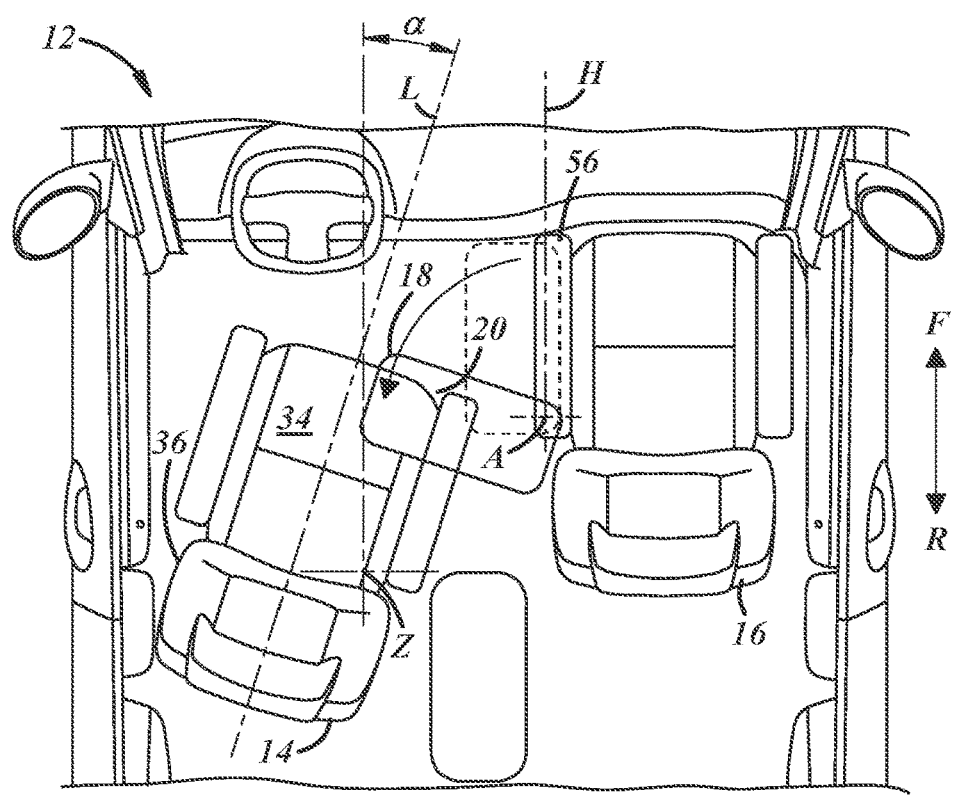
FIG. 8 is a top view of the interior of the passenger cabin of FIG. 7 illustrating the panel in the working position.

FIGS. 7-8 illustrate another example in which the panel 18 is located along an inboard side 54 of the second seat 16 with the working surface 20 in a vertical orientation while in the stowed position. In this particular example, the second seat 16 comprises an armrest 56 that supports the panel 18 along the vertical axis A during panel movement between the stowed position and the working position. As in the previous examples, panel movement includes both vertical movement and rotation about the vertical axis A. In the stowed position of the panel 18 shown in FIG. 7, the working surface 20 is oriented vertically and facing toward an outboard side of the second seat 16. The panel 18 may be stowed in a compartment or recess formed in the armrest 56 or along an inboard side of the armrest such that the entire panel is at or below a top surface of the arm rest.

From this vertical stowed position, the panel 18 may be first moved vertically to a position above the armrest 56, then rotated about a horizontal pivot axis H to bring the working surface 20 to a horizontal orientation, as shown in FIG. 8 in broken lines. Finally, the panel 18 may be rotated about the vertical axis A to the working position with the working surface 20 in front of the backrest 36 and higher than the occupant seating surface 34 of the inwardly rotated first seat 14, and with the working surface extending radially away from the vertical axis A in a direction that is perpendicular or otherwise orthogonal with the longitudinal axis of the first seat.

The illustrated movement can be accomplished, for example, via a movement mechanism that includes an extendable and retractable support post similar to that of FIG. 1 that has a lower end coupled with the armrest 56 and an upper end coupled with a hinge or ball-joint along the H axis. Such a support post can provide vertical movement of the panel 18 toward and away from the stowed position. The hinge or ball-joint is at the upper end of the support post is coupled with the panel 18 to provide pivotal movement of the panel 18 about the horizontal pivot axis H. A pivot joint such as that described in conjunction with FIG. 1 may be employed at either end or elsewhere along the support post to provide rotational movement about the vertical axis A. This is of course only one example of a movement mechanism capable of moving the panel between a vertical stowed position and a horizontal working position.

The embodiment of FIGS. 7-8 offers the additional advantage that the panel 18 can be moved between the stowed and working positions whether the second seat is in an occupant seating position or a fold-forward position. The panel 18 moves forward and rearward with the armrest 56 and thus with the seat as a whole during adjustment of the seat 16 in the forward and rearward directions. Also, locating the vertical axis A at the armrest 56 can provide a further inboard rotational axis allowing the panel 18 and working surface 20 to extend further in the direction of the longitudinal axis L of the first seat.

Since a fold-forward position is not required in this embodiment, the panel 18 could deployable from a stowed position alongside either of the transversely spaced seats for use by the occupant of the other seat when inwardly rotated. For example, the passenger side seat in the figures may be considered as the first seat in the above description so that the deployable working surface is available to the non-driving seat occupant even when the vehicle is in a non-autonomous driving mode. The example of FIGS. 7-8 may also include additional features of the examples of FIGS. 1-6 and the accompanying descriptions, such as a movement mechanism with coordinated rotational and vertical movement, an extendable portion of the panel, etc.

Automated panel movement between the stowed and working positions may be provided by mechanisms with known components such as a motor, solenoid, fluid-powered cylinder, or other actuator. Manual movement is of course also possible with various degrees of freedom provided by components such as those described above. Movement actuation may be initiated by user input received by a user input device (e.g., a switch or touch interface), or it may be initiated as part of an automated reconfiguration of the passenger cabin between the driving and autonomous configurations. For example, in the driving configuration, the first seat 14 may be in a longitudinally forward position and its forward-facing position with the panel 20 in its stowed position. When the vehicle changes to a workspace mode or other autonomous mode, the first seat 14 may translate to a rearward position and rotate to the pre-determined inwardly-rotated position, and the panel may move to its working position. Depending on the mounting location of the panel with respect to the second seat 16, the second seat may change from the occupant seating position to the fold-forward position and/or move longitudinally forward in the passenger cabin. These movements may be coordinated, overlapping in time or occurring simultaneously, or they may happen sequentially. Once the first seat 14 is in the rotated position and the panel 18 is in the working position, further adjustments of the panel 18 and/or seat 14 may be made by the seat occupant, such as adjustments of the longitudinal, rotational, or vertical position of the working surface 20 or extension of a portion of the panel.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A personal automotive vehicle having a reconfigurable passenger cabin, comprising:
   a first seat coupled with a body of the vehicle in the passenger cabin for rotational movement between a forward-facing position and an inwardly-rotated position, the first seat comprising a seat bottom and a backrest, the seat bottom having an occupant seating surface;
   a second seat coupled with the body of the vehicle and spaced transversely from the first seat in the passenger cabin; and
   a panel having a working surface and being mounted on the second seat, the panel being moveable between a stowed position and a working position,
   wherein movement of the panel between the stowed position and the working position includes translation of the panel with respect to the second seat along a vertical axis and rotation of the panel with respect to the second seat about the vertical axis,
   wherein the panel comprises a first portion mounted on the second seat and a second portion that is moveable with respect to the first portion, the second portion of the panel comprising at least a portion of the working surface,
   wherein both the first portion and the second portion of the panel rotate with respect to the second seat about the vertical axis during said movement between the stowed position and the working position, and
   wherein, when the first seat is in the inwardly-rotated position and the panel is in the working position, the working surface of the panel is higher than the occupant seating surface and in front of the backrest and extends radially away from the vertical axis in a direction orthogonal with a longitudinal axis of the first seat.

2. A personal automotive vehicle as defined in claim 1, wherein the working surface is moveable in forward and rearward directions via movement of the second seat in the forward and rearward directions.

3. A personal automotive vehicle as defined in claim 1, wherein the second portion of the panel is configured for translational movement with respect to the first portion of the panel in a direction that is orthogonal with the longitudinal axis of the first seat when the first seat is in the inwardly-rotated position and the panel is in the working position.

4. A personal automotive vehicle as defined in claim 1, wherein the second portion of the panel is configured for rotational movement with respect to the first portion of the panel about a pivot axis.

5. A personal automotive vehicle as defined in claim 4, wherein the pivot axis is vertical when the panel is in the working position.

6. A personal automotive vehicle as defined in claim 4, wherein the pivot axis is horizontal when the panel is in the working position.

7. A personal automotive vehicle as defined in claim 1, wherein the working surface extends over the occupant seating surface and beyond the longitudinal axis of the first seat when in the working position.

8. A personal automotive vehicle as defined in claim 1, wherein the second seat comprises a backrest that is movable between an occupant seating position and a fold-forward position and the panel is mounted on the backrest of the second seat for movement with the backrest of the second seat while the panel is in the stowed position.

9. A personal automotive vehicle as defined in claim 1, wherein the working surface is in a vertical orientation and located along an inboard side of the second seat when in the stowed position.

10. A personal automotive vehicle as defined in claim 1, wherein the second seat comprises an armrest that supports the panel along said vertical axis during panel movement between the stowed and working positions.

11. A personal automotive vehicle as defined in claim 10, wherein the second seat comprises a backrest that is movable between an occupant seating position and a fold-forward position and the panel is moveable between the stowed and working positions in both positions of the backrest of the second seat.

12. A personal automotive vehicle as defined in claim 1, wherein the vertical axis passes through the second seat.

13. A personal automotive vehicle as defined in claim 1, wherein the vertical axis is located along an inboard side of the second seat.

14. A personal automotive vehicle as defined in claim 1, wherein the personal automotive vehicle is an autonomous vehicle having a driving mode and an autonomous mode, the passenger cabin being reconfigurable between a driving configuration in which the first seat is in the forward-facing position and an autonomous configuration in which the first seat is in the inwardly-rotated position, whereby the working surface is usable by an occupant of the first seat while the vehicle is operating in the autonomous mode.

15. A personal automotive vehicle as defined in claim 1, wherein a longitudinal axis of the vehicle and a longitudinal axis of the first seat are parallel in the forward-facing position and an oblique angle is formed between said longitudinal axes in the inwardly-rotated position.

16. A personal automotive vehicle as defined in claim 1, wherein an angle in a range from 15 degrees to 25 degrees is formed between a longitudinal axis of the vehicle and a longitudinal axis of the first seat in the inwardly-rotated position.

17. A personal automotive vehicle as defined in claim 1, wherein the vehicle is a passenger car, coupe, sedan, SUV, cross-over vehicle or light-duty pick-up truck.

18. A personal automotive vehicle as defined in claim 1, wherein the working surface extends over an inboard side of the occupant seating surface in the working position.

19. A personal automotive vehicle as defined in claim 1, wherein the working surface remains in parallel planes throughout panel movement between the stowed position and the working position, including during said translation of the panel with respect to the second seat along the vertical axis.

20. A personal automotive vehicle having a reconfigurable passenger cabin, comprising:
  a first seat coupled with a body of the vehicle in the passenger cabin for rotational movement between a forward-facing position and an inwardly-rotated position, the first seat comprising a seat bottom and a backrest, the seat bottom having an occupant seating surface;
  a second seat coupled with the body of the vehicle and spaced transversely from the first seat in the passenger cabin, wherein the first and second seats are part of a front row of seating of the vehicle; and
  a panel having a working surface and being mounted on the second seat, the panel being moveable between a stowed position and a working position,
  wherein movement of the panel between the stowed position and the working position includes translation of the panel with respect to the second seat along a vertical axis and rotation of the panel with respect to the second seat about the vertical axis,
  wherein, when the first seat is in the inwardly-rotated position and the panel is in the working position, the working surface of the panel is higher than the occupant seating surface and in front of the backrest and extends radially away from the vertical axis in a direction orthogonal with a longitudinal axis of the first seat, and
  wherein the personal automotive vehicle is an autonomous vehicle having a driving mode and an autonomous mode, the passenger cabin being reconfigurable between a driving configuration in which the first seat is in the forward-facing position and an autonomous configuration in which the first seat is in the inwardly-rotated position, whereby the working surface is usable by an occupant of the first seat while the vehicle is operating in the autonomous mode.

\* \* \* \* \*